(12) United States Patent
Meillan

(10) Patent No.: US 9,173,415 B2
(45) Date of Patent: Nov. 3, 2015

(54) BULK FLUID REFRIGERATION AND HEATING

(75) Inventor: Jean-Pierre Meillan, Wroclaw (PL)

(73) Assignee: DELAVAL HOLDING AB, Tumba (SE)

( * ) Notice: Subject to any disclaimer, the term of this patent is extended or adjusted under 35 U.S.C. 154(b) by 314 days.

(21) Appl. No.: 13/977,018

(22) PCT Filed: Dec. 29, 2011

(86) PCT No.: PCT/SE2011/051605
§ 371 (c)(1),
(2), (4) Date: Jun. 28, 2013

(87) PCT Pub. No.: WO2012/091672
PCT Pub. Date: Jul. 5, 2012

(65) Prior Publication Data
US 2013/0269367 A1 Oct. 17, 2013

Related U.S. Application Data

(60) Provisional application No. 61/428,364, filed on Dec. 30, 2010.

(30) Foreign Application Priority Data

Dec. 30, 2010 (GB) .................................. 1022113.3

(51) Int. Cl.
*F25B 21/00* (2006.01)
*A23C 3/04* (2006.01)
*A01J 9/04* (2006.01)

(52) U.S. Cl.
CPC ... *A23C 3/04* (2013.01); *A01J 9/04* (2013.01); *F25B 21/00* (2013.01); *F25B 2321/002* (2013.01); *Y02B 30/66* (2013.01)

(58) Field of Classification Search
CPC .. F25B 21/00; F25B 2321/0021; Y02B 30/66
USPC .................................................. 62/3.1, 324.1
See application file for complete search history.

(56) References Cited

U.S. PATENT DOCUMENTS 2,619,603 A 11/1952 Chilowsky
4,674,288 A * 6/1987 Kuriyama et al. ............... 62/3.3
(Continued)

FOREIGN PATENT DOCUMENTS

FR 2 562 082 A1 10/1985
FR 2 875 895 A1 3/2006
(Continued)

OTHER PUBLICATIONS

British Search Report, dated Mar. 31, 2011, from corresponding British application.
(Continued)

*Primary Examiner* — Melvin Jones
(74) *Attorney, Agent, or Firm* — Young & Thompson

(57) ABSTRACT

An apparatus for refrigeration and heating of bulk fluid, and particularly, but not exclusively, to the refrigeration of bulk milk freshly obtained from dairy animals such as cows. The apparatus is provided with a refrigerated bulk milk tank and magnetic refrigeration unit for refrigerating and heating, as appropriate, the fluid stored in said tank. The fluid stored in the tank is one of (i) milk, (ii) milk and one or more fermenting agents, (iii) a cleaning fluid, (iv) water, and (v) air. Normally, the fluid stored in the tank is milk.

19 Claims, 10 Drawing Sheets

(56) References Cited

U.S. PATENT DOCUMENTS

| | | | |
|---|---|---|---|
| 5,124,215 | A | 6/1992 | Hashimoto |
| 5,195,456 | A | 3/1993 | Van Der Lely et al. |
| 5,272,997 | A | 12/1993 | Van Der Lely et al. |
| 7,481,064 | B2 | 1/2009 | Kitanovski et al. |
| 2003/0230243 | A1 | 12/2003 | Van Der Lely et al. |
| 2006/0218936 | A1* | 10/2006 | Kobayashi et al. ............ 62/3.1 |
| 2007/0144181 | A1 | 6/2007 | Kitanovski et al. |
| 2008/0216484 | A1* | 9/2008 | Tsuji et al. ............... 62/3.3 |
| 2008/0236172 | A1 | 10/2008 | Muller et al. |
| 2008/0314049 | A1 | 12/2008 | Shin et al. |
| 2010/0236258 | A1 | 9/2010 | Heitzler et al. |
| 2011/0042608 | A1 | 2/2011 | Reesink |

FOREIGN PATENT DOCUMENTS

| | | |
|---|---|---|
| FR | 2 940 526 A1 | 6/2010 |
| RU | 2 206 214 C1 | 6/2003 |
| SU | 565163 A | 7/1977 |
| SU | 1021889 A | 6/1983 |
| WO | 02/074069 A1 | 9/2002 |
| WO | 2004/059221 A1 | 7/2004 |
| WO | 2009/087310 A2 | 7/2009 |
| WO | 2009/090442 A1 | 7/2009 |
| WO | 2009/133048 A1 | 11/2009 |
| WO | 2010/038098 A1 | 4/2010 |
| WO | 2010/038099 A1 | 4/2010 |

OTHER PUBLICATIONS

International Search Report, dated May 23, 2012, from corresponding PCT application.
Supplementary International Search Report, dated Apr. 18, 2013, from corresponding PCT application.
S.V. Melnikov, Tekhnologicheskoe oborudovanie zhivotnovodcheskikh ferm i kompleksov. Leningrad, Agropromizdat, Leningradskoe otdelenie, 1985, pp. 506-510.

* cited by examiner

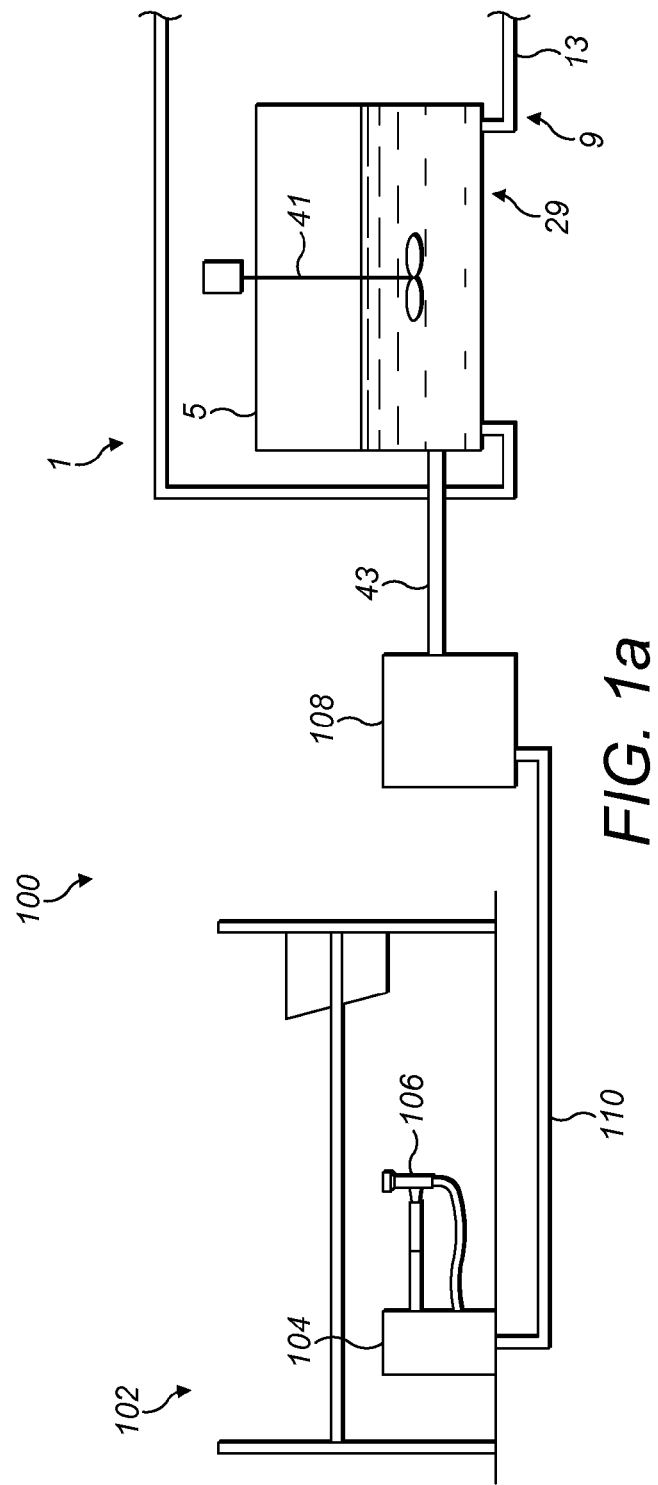

BULK FLUID REFRIGERATION AND HEATING

The present invention relates to the refrigeration and heating of bulk fluid, and particularly, but not exclusively, to the refrigeration of bulk milk freshly obtained from dairy animals such as cows.

It is well understood by dairy farmers and dairies that milk freshly obtained from a dairy animal should be refrigerated as soon as possible in order to maximise the shelf life of the milk product. Typically, milk freshly obtained from a dairy animal must be cooled from a temperature of +35° C. down to below +4° C. within a specified cooling time of generally between two hours and three and a half hours. There are a number of standards regulating the bulk refrigeration of dairy milk and specifying refrigeration requirements. One such standard is "EN 13732+A2:2009; Food processing machinery-Bulk milk coolers on farms—Requirements for construction, performance, suitability for use, safety and hygiene". However, generally, milk freshly obtained from a dairy animal (i.e. obtained within a previous two hour period) is typically cooled and maintained at a temperature below +4° C. in a refrigerated bulk milk tank. As defined in the aforementioned standard, and for the purposes of the present patent specification, a refrigerated bulk milk tank is to be understood as being equipment for the refrigeration and bulk storage of refrigerated raw milk freshly milked (i.e. milk which is less than two hours old after having been milked).

A conventional refrigerated bulk tank reduces the temperature of stored milk and maintains a required refrigerated temperature through the application of the well known Carnot cycle. The application of the Carnot cycle typically requires use of a motor driven compressor for compressing a liquid-gas refrigerant and an expansion device (for example, an expansion valve or nozzle) through which compressed refrigerant may expand and vaporise. As will be appreciated by those skilled in the art, refrigerant is compressed as a gas by the compressor which, in turn, raises its temperature and pressure. The hot and high-pressure refrigerant gas is then driven through an arrangement of thin pipes exposed to ambient air with the result that heat in the refrigerant is conducted to the ambient air and the refrigerant cools and condenses into a liquid. The refrigerant liquid then continues to be pumped into the expansion device where it experiences a sudden drop in pressure allowing it to expand and revert to a gas. During the expansion, the refrigerant rapidly cools. The refrigerant is then continued to be driven through pipework (which is used as a heat exchanger, and specifically an evaporator) in the refrigeration tank or the base/walls thereof. As a result, the cold refrigerant absorbs and removes heat from the milk held by the tank. The temperature of the refrigerant increases as it absorbs heat from the stored milk and evaporates prior to it exiting the milk cooling region and returning to the compressor for another cycle. It will be appreciated therefore that the repeating cycle allows the refrigerant to continually pick up heat from inside the refrigerated tank and transport this heat to outside the tank where it is put down. The two pipework arrangements (for transporting heat in the compressed refrigerant to the ambient air and for transporting heat from the stored milk to the expanded refrigerant) may each be regarded as forming part of a heat exchanger, and more specifically, a condenser and evaporator respectively.

Whilst refrigerated bulk milk tanks have successfully operated on the basis of the Carnot cycle for many years, there are a number of problems associated with such tanks. Their problems include the following:

1. Conventional refrigeration systems operating on the Carnot cycle are relatively complicated and require trained and approved refrigeration engineers for their installation and servicing.
2. Conventional refrigeration systems require the use of liquid-gas refrigerants such as HCFCs which are damaging to the environment (in particular the ozone layer) or HFCs which can be associated with Global Warming. For this reason, these conventional refrigerants are closely regulated and, in some countries, highly taxed. The dangers of the refrigerants also complicate destruction of conventional refrigeration tanks.
3. New refrigerants are available which are less damaging to the environment, however they tend to require higher operating pressures and, as a result, the heat exchangers are necessarily more robust in order to avoid the risks of leakages and to satisfy regulations governing pressure equipment. The heat exchangers are therefore more expensive than those used with more conventional refrigerants, and most of the new refrigerants are themselves more expensive and their influence on the environment remains unclear.
4. Conventional refrigeration systems do not allow for a precise control of the temperature of the refrigerant. This is a particular problem after expansion of the refrigerant in the expansion device, which can give rise to a freezing of milk in the refrigeration tank, particularly in circumstances where the ambient temperature is low or the quantity of milk in the tank is low. Modifications addressing this freezing problem in a conventional refrigeration system are costly and can increase the electricity consumption whilst decreasing the life of the system.

It is an object of the present invention to provide a simple, efficient, inexpensive and safe (both to the environment and to the user) refrigeration bulk milk tank.

It is an object of the present invention to provide a refrigeration bulk milk tank having an improved efficiency, ideally to such an extent that power consumption is reduced to approximately half of that of a conventional tank.

It is a further object of the present invention to provide a refrigerated bulk milk tank which allows for a precise control of the temperature of the heat transfer liquid so as to avoid, in particular, a freezing of milk in the tank.

A first aspect of the present invention provides apparatus as recited in the appended independent claim 1.

Further features of the present invention are provided as recited in the appended dependent claims 2 to 70.

Apparatus may be provided comprising a refrigerated bulk milk tank; characterised in that the apparatus comprises magnetic refrigeration means for refrigerating milk stored in said tank. Also, a method of refrigerating using any of the apparatus of the appended apparatus claims or any of the apparatus recited herein may be provided.

Embodiments of the present invention will now be described with reference to the accompanying drawings, in which:

FIG. 1a is a schematic view of an animal milking installation according to the present invention, the installation having an animal milking stall provided with an automatic milking robot for attaching teat cups to animal teats, a refrigerated bulk milk tank, and pipes connecting the teat cups to the milk tank;

Apparatus 1 according to the present invention is provided in the installation 100 shown in FIG. 1a of the accompanying drawings. The apparatus 1 comprises a refrigerated bulk milk tank 5 and FIG. 1a in particular schematically shows the tank 5 itself together with associated equipment for refrigerating milk contained within the tank 5. It is to be understood that whilst the apparatus shown in the accompanying drawings are principally described with reference to milk which is received in the tank 5, the apparatus may nevertheless be used to store, refrigerate and/or heat other fluids instead of milk. These other fluids include (i) a mixture of milk and one or more fermenting agents, (ii) a cleaning fluid, (iii) water and (iv) air.

Figure 1B:
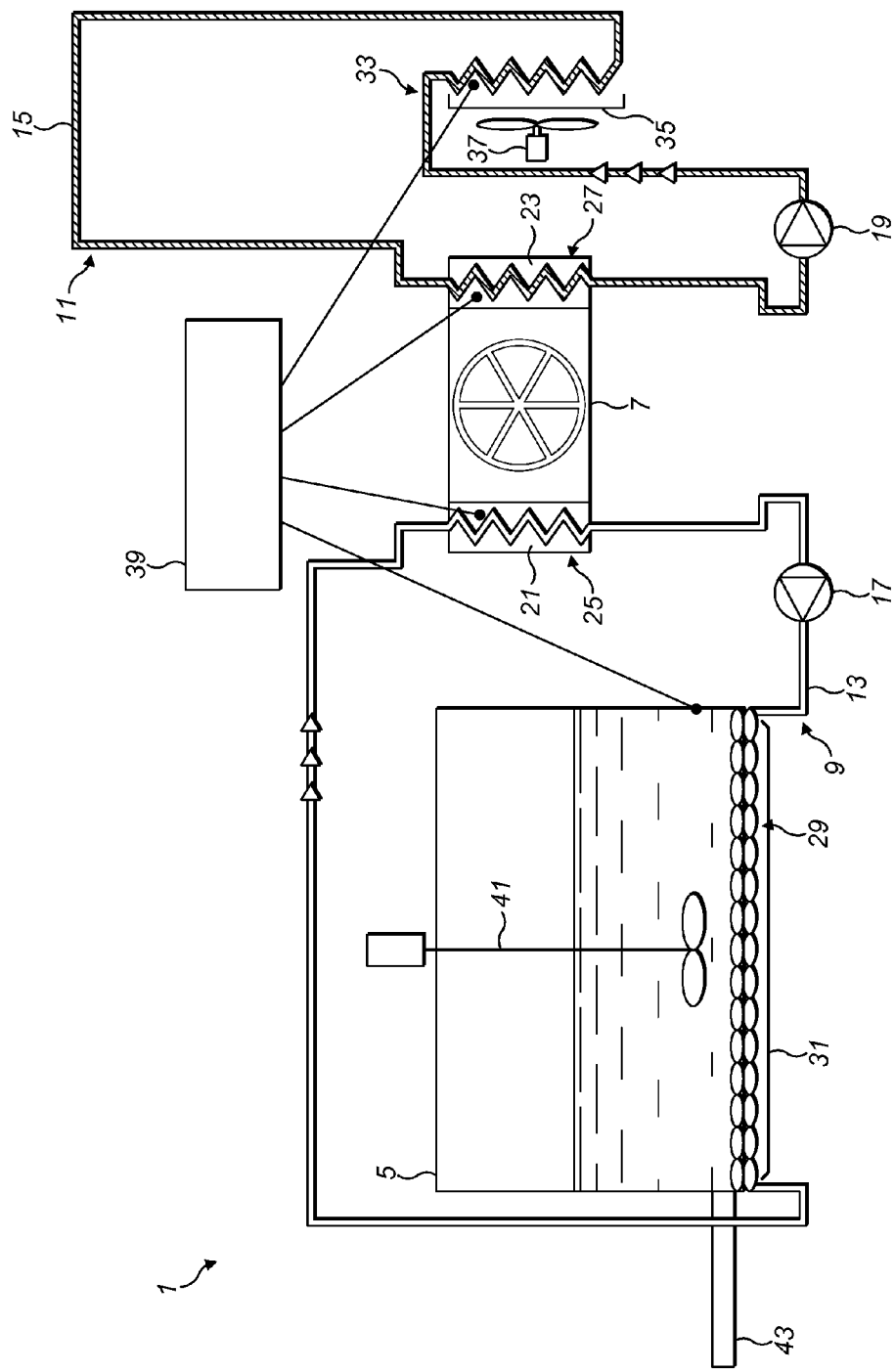
FIG. 1b is a schematic hydraulic diagram of a refrigerated bulk milk tank according to the present invention.

The installation 100, as shown in FIG. 1a, includes an animal milking stall 102 provided with an automatic milking robot 104 for attaching teat cups 106 to animal teats. The teat cups 106 (only one of which is shown in FIG. 1a) are fluidly connected to vacuum milking equipment 108 known in the art by means of pipes 110 known in the art. This arrangement is schematically shown in FIG. 1a. The vacuum milking equipment 108 is itself fluidly connected to the refrigerated bulk milk tank 5 of the apparatus 1 by means of tank inlet pipe(s) 43 (schematically shown in FIGS. 1a and 1b). Accordingly, in the installation 100 shown in FIG. 1a, milk is obtained automatically (i.e. without human intervention) from an animal and may be automatically (i.e. without human intervention) transported directly from the animal into the refrigerated bulk milk tank 5. It is to be understood however that the present invention is not limited to apparatus connected to milking equipment.

The associated equipment for refrigerating milk includes a magnetic heat pump 7 and first and second thermal communication means 9,11 associated with the magnetic heat pump 7. As will be discussed in greater detail below, the first thermal communication means generally operates to transport heat from milk stored in the tank 5 to the magnetic heat pump 7. Conversely, the second thermal communication means 11 generally operates to transport heat from the magnetic heat pump 7.

The first and second thermal communication means 9,11 include a number of components schematically illustrated in FIG. 1b. Firstly, the first and second thermal communication means 9,11 respectively include first and second closed loop fluid circuits 13,15 through which a heat transporting fluid may pass during use. The fluid in each circuit 13,15 may be of the same type and is ideally water. More preferably, the fluid is water mixed with an anti-freezing agent, such as mono propylene glycol (or any other anti-freezing agent approved for use in the food industry). The two circuits 13,15 of the embodiment shown in FIG. 1b are isolated from one another, however, a benefit of using a common type of fluid in these circuits is that the circuits can be connected to beneficial effect during certain operations as will be evident from the modified arrangements shown in FIGS. 2 to 6 of the accompanying drawings.

Each circuit 13,15 is provided with a pump 17,19 for pumping fluid around the respective circuit 13,15. Each pump 17,19 is driven by a motor (not shown). A separate motor is provided for driving each of the two pumps 17,19 and, accordingly, each pump 17,19 is driven by its own motor. However, in an alternative embodiment, the two pumps 17,19 are driven by a single motor common to both pumps 17,19. In this alternative embodiment, the two pumps 17,19 are both driven at the same time, however means may be provided for selectively disengaging one or the other of the pumps 17,19 from the motor to thereby allow independent operation of the pumps 17,19 despite the use of only one motor. Such a disengagement of the motor drive may be achieved through use of a clutch arrangement (not shown) as will be understood by those skilled in the art.

Each of the thermal communication means 9,11 further includes two heat exchangers. One heat exchanger 25,27 of each thermal communication means 9,11 operates to transfer heat between magnetocaloric members (not shown in FIGS. 1 to 6) of the magnetic heat pump 7 and the fluid in the respective circuits 13,15 of the thermal communication means 9,11. Parts 21,23 of the first and second fluid circuits 13,15 respectively forming the heat exchangers 25,27 of the magnetic heat pump 7 are merely shown schematically in FIG. 1b of the accompanying drawings. The operation of such heat exchangers in a magnetic heat pump will be well understood by those skilled in the field of magnetic refrigeration, however, a brief discussion in this regard is provided below.

For the purposes of clarity and aiding the understanding of how the apparatus 1 shown in FIG. 1b operates, reference will now be made to the magnetic refrigeration cycle of the magnetic heat pump 7. As will be understood by those familiar with magnetic refrigeration, a magnetic heat pump comprises magnetocaloric material which has the characteristic effect of undergoing a reversible change in temperature when exposed to a changing magnetic field. Specifically, a decrease in the strength of an externally applied magnetic field results in the temperature of the material dropping. Conversely, if a magnetic field is applied to a magnetocaloric material (or the strength of such a field is increased), then the temperature of the material increases. However, this effect only takes place for a given magnetocaloric material for a given temperature range specific to that material. Only in relatively recent years have magnetocaloric materials become operable at room temperatures, but typically with limited operating temperature ranges. In order to ensure the magnetic heat pump 7 has a sufficiently broad overall temperature operating range, a number of different types of magnetocaloric material are provided in the heat pump. Which of these different types of material operates at any one time as described above depends upon ambient conditions (for example, the temperature of the milk). By way of example, and as discussed in greater detail below, the heat pump 7 may comprise one or more of the following magnetocaloric materials: (i) Gadolinium and Gadolinium-Terbium alloys; (ii) Mn Fe P As alloys; and (iii) $La(Fe,Co,Si)_{13}$ alloys. The heat pump 7 may comprise a plurality of magnetocaloric members wherein each magnetocaloric member comprises one of said magnetocaloric materials.

Many developments relating to magnetocaloric materials (operable at room temperature) are currently being made by various laboratories around the World. As suggested above, the heat pump 7 of the apparatus described herein can be constructed using various different types of magnetocaloric materials—such as Gadolinium and Gadolinium-Terbium alloys, or Mn Fe P As alloys (as, for example, produced in a method described in WO 2009/133048 A1, which is incorporated herein by reference), or $La(Fe,Co,Si)_{13}$ alloys (as produced in a method particularly described in WO 2010/038099 A1, WO 2009/090442 A1, and WO 2010/038098A1 which are incorporated herein by reference).

Figure 8:
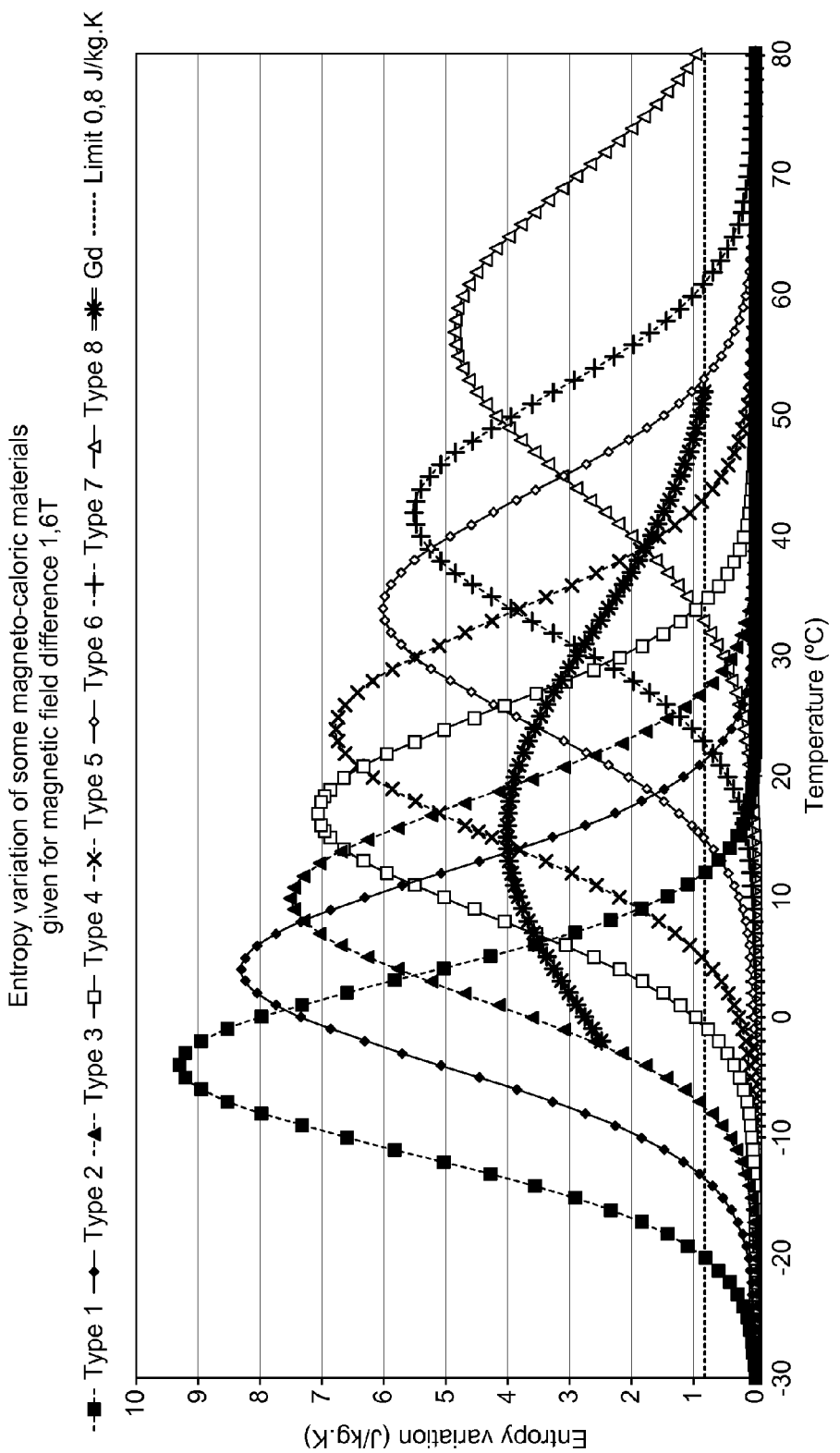
FIG. 8 is a graph showing how entropy variation of specified magnetocaloric materials varies with temperature when said materials are exposed to a variation in magnetic field of 1.6 T (tesla).

As is shown in FIG. 8 of the accompanying drawings, magnetocaloric materials may be characterised by their Curie points. The curved line denoted by the letters "Gd" in FIG. 8 shows how entropy variation (in Joules per kilogramme Kelvin, i.e. in J/kg.K) of Gadolinium, produced by a change in magnetic field of 1.6 tesla, varies with temperature. The Curie point of Gadolinium (the maximum value on the curve) is close to 16° C. (which corresponds to an entropy variation of almost 4 J/kg.K). As will be evident from FIG. 8, Gadolinium exhibits a magnetocaloric effect over a relatively broad temperature range (from 0° C. to between 30° C. and 40° C.) and may be used in embodiments of the present invention. In contrast to Gadolinium, $La(Fe,Co,Si)_{13}$ alloys have a relatively high entropy variation for a given temperature, but exhibit a magnetocaloric effect in a narrower temperature range (in particular, see $La(Fe,Co,Si)_{13}$—Type 4 below). Magnetocaloric materials exhibiting a magnetocaloric effect across a wide range of temperatures are of particular use in the system described herein.

In particularly preferred embodiments of the present invention, the heat pump 7 mentioned herein comprises eight types of $La(Fe,Co,Si)_{13}$ alloy. These eight types of alloy have different Curie points and overlapping temperature ranges in which they exhibit a magnetocaloric effect, and they are commercially available to order. They are produced in accordance with WO 2010/038099 A1. Their specification is listed below and they display a variation of entropy as shown in FIG. 8.

Type 1 has its Curie point at −4° C., and mainly exhibits its magnetocaloric effect between −12° C. and +5° C.
Type 2 has its Curie point at +4° C., and mainly exhibits its magnetocaloric effect between −5° C. and +15° C.
Type 3 has its Curie point at +10° C., and mainly exhibits its magnetocaloric effect between −2° C. and +23° C.
Type 4 has its Curie point at +17° C., and mainly exhibits its magnetocaloric effect between +5° C. and +28° C.
Type 5 has its Curie point at +24° C., and mainly exhibits its magnetocaloric effect between +12° C. and +35° C.
Type 6 has its Curie point at +34° C., and mainly exhibits its magnetocaloric effect between +23° C. and +46° C.
Type 7 has its Curie point at +42° C., and mainly exhibits its magnetocaloric effect between +32° C. and +52° C.
Type 8 has its Curie point at +57° C., and mainly exhibits its magnetocaloric effect between +45° C. and +67° C.

For milk cooling applications, it is important to provide a selection of magnetocaloric materials exhibiting a magnetocaloric effect in a temperature range similar to that mentioned above.

With reference to FIG. 8, it will be seen that the magnetocaloric effect exhibited by each of the magnetocaloric materials represented in FIG. 8 is such that each material has a change in entropy (which is produced by a change in magnetic field of 1.6 tesla) which is greater than substantially 0.8 J/kg.K across a range of temperatures, where said temperature range is between substantially minus 15 degrees Celsius and substantially plus 80 Celsius and preferably between substantially minus 10 degrees Celsius and substantially plus 75 degrees Celsius. Preferably, said temperature range of one (Type 1) of the magnetocaloric materials has a lower temperature of substantially minus 15 degrees Celsius and said temperature range of another one (Type 8) of the magnetocaloric materials has an upper temperature of substantially plus 80 degrees Celsius.

The aforementioned change in entropy (which is produced by a change in magnetic field of 1.6 tesla) may be greater than substantially 2.0 J/kg.K across a range of temperatures. In this case, said temperature range is between substantially minus 15 degrees Celsius and substantially plus 70 degrees Celsius. Preferably, said temperature range of one (Type 1) of the magnetocaloric materials has a lower temperature of substantially minus 15 degrees Celsius and said temperature range of another one (Type 8) of the magnetocaloric materials has an upper temperature of substantially plus 70 degrees Celsius.

More specifically, the materials should not exhibit a magnetocaloric effect at too low a temperature, for example below −15° C. (or perhaps no less than −20° C.), because there would then be a risk of the heat transfer liquid circulating in the first fluid circuit 13 being at too low a temperature, which could lead to the milk in the tank 5 freezing on the surface of the heat exchanger 29. Conversely, regarding the high end of the temperature operating range, the materials should exhibit a magnetocaloric effect above the highest ambient temperature where the apparatus will be operated, plus some temperature difference for achieving the heat exchange in heat exchangers 33,27. The Type 8 material specified above will be adequate for this purpose in the context of bulk milk tank cooling, allowing operation at least up to approximately 45° C. ambient temperature.

Alternative magnetocaloric materials may be used which exhibit a magnetocaloric effect substantially the same as, or similar to, that shown in FIG. 8 and as described above, but for a different change in magnetic field, for example, for a smaller change in magnetic field. For example, the change in magnetic field may be 0.5 tesla.

The materials specified above would also allow the heat pump 7 to prepare hot water up to around 55° C. to 60° C. (see the below description relating to FIGS. 5 and 6). Nevertheless, it is still further possible to select other types of magnetocaloric material which operate at slightly higher temperatures, for example with Curie points up to 70° C. or 80° C., in order to prepare even warmer hot water for the needs of a farm. Again, these materials are commercially available to the skilled person.

The material specifications of Types 1 to 8 above are given so as to provide specific examples of materials for use in the embodiments described herein. These materials are also ones actually used by the inventor in a working prototype. However, as will be understood by a person skilled in the art, another selection of materials could be made wherein the materials have different Curie points. In view of the above discussion, it will be understood that the temperature range in which the selection of materials exhibits a magnetocaloric effect should ideally be between −15° C. and +90° C.

As discussed, the Curie points of the materials selected may be different to those mentioned above. The Curie points may be selected in dependence on the number of different types of magnetocaloric material used. The heat pump 7 has eight different types of magnetocaloric material, but this number could be changed, and this may influence the Curie points selected. The number of stages (see below) can also be varied, and the number of types of magnetocaloric material used in each stage can also be changed, and each of these variables can influence the selection of the Curie points.

With regard to the thermodynamic refrigeration cycle of the magnetic heat pump, this may be considered analogous to the Carnot cycle mentioned above. Rather than compressing a refrigerant gas so as to increase its temperature as in the Carnot cycle, a temperature increase in the magnetocaloric members (comprising magnetocaloric material) of the heat pump 7 is achieved by applying a magnetic field to said members. In a similar manner to the hot gaseous refrigerant being cooled and condensed in the Carnot cycle through exposure to ambient air, the magnetocaloric members of the heat pump 7 are cooled with ambient air by means of the second thermal communication means 11. Ideally therefore, the temperature of the magnetocaloric members is thereby reduced to that of an ambient temperature, whilst exposed to the magnetic field. In the analogous Carnot cycle, the cooled and condensed refrigerant is pumped into an expansion device and expanded, resulting in a rapid drop in temperature of the refrigerant. Conversely, in the magnetic heat pump 7, the magnetic field is removed from the magnetocaloric members which results in a drop in the temperature of said members. Heat in the milk held by the tank 5 may then be removed from said milk and absorbed by the magnetocaloric members through operation of the first thermal communication means 9. This last step is analogous to the pumping of the expanded and cooled refrigerant through the base/walls of the tank in the conventional Carnot cycle.

As alluded to above during the discussion of the first and second thermal communication means 9,11, it will be appreciated that the magnetocaloric members of the heat pump 7 exchange heat with the fluid in the first fluid circuit 13 and the second fluid circuit 15 by means of two heat exchangers 25, 27. The heat exchanger 27 of the second circuit 15 operates to reduce the temperature of the magnetocaloric members whilst said members are subjected to a magnetic field (or an increased magnetic field strength). Conversely, the heat exchanger 25 of the first fluid circuit 13 operates to increase the temperature of the magnetocaloric members once the magnetic field has been reduced or removed from said member. The first thermal communication means 9 may therefore be regarded as being located on the "cold side" of the magnetic heat pump 7, whilst the second thermal communication means 11 may be regarded as being located on the "warm side" of the magnetic heat pump 7. For the avoidance of doubt, it is to be understood that each of the heat exchangers 25,27 includes a fluid circuit which retains fluid (a fluid heat carrier) for transferring heat between the magnetocaloric members and the fluid in the respective first and second fluid circuits 13,15. A heat pump suitable for use in the embodiment shown in FIG. 1b may be provided in accordance with the teaching of International patent publication WO 2009/087310 A2 and the disclosure of this document is incorporated by reference into the present application. It will be appreciated therefore that the magnetic heat pump 7 comprises magnetic members providing a magnetic field (i.e. magnetic means 3 as mentioned in the aforementioned WO 2009/087310 A2) and magnetocaloric members (i.e. magnetocaloric elements 2 as mentioned in the aforementioned WO 2009/087310 A2) arranged as rotor and stator elements respectively so as to be moveable relative to one another upon rotation of the rotor by a motor. The magnetic members of the rotor are arranged to provide a number of magnetic fields (magnetic areas). In this way, magnetic fields may be repeatedly applied to and removed from the magnetocaloric members. It will also be appreciated that the rotary speed may be increased to increase the cooling capacity as necessary. Typically the rotary speed is 90 RPM, with an operating range of between 60 RPM and 120 RPM.

According to the teaching of the aforementioned WO 2009/087310 A2 document, it will be further understood by those skilled in the art that a thermal mini-generator as described in said document comprises a magnetocaloric member/element together with an associated fluid heat carrier circuit (including at least one fluid driving piston 40 as mentioned in the aforementioned WO 2009/087310 A2) for carrying an internal fluid (i.e. a fluid internal to the heat pump) and thereby transporting heat to/from the magnetocaloric member/element, and that a number NR of these thermal mini-generators are arranged in a circle around a central axis and function in parallel. The number NR of mini-generators influences the power of the magnetic heat pump (a higher number NR provides more power).

An arrangement of thermal mini-generators about magnetic members moveable relative thereto may be regarded as a thermal stage (or thermal module 10,11,12,13 as mentioned in the aforementioned WO 2009/087310 A2) and it will be further understood that these stages may be stacked in series and that the number X of stacked stages influences the temperature range of the magnetic heat pump (a higher number X provides a bigger temperature span, and therefore a broader temperature range of operation between the lower possible operating temperature in the low temperature side and the higher possible operating temperature in the high temperature side).

In the context of the embodiments described herein, the heat pump 7 is provided with two thermal stages (i.e. X=2), wherein each stage has thirty six thermal mini-generators (i.e. NR=36) with magnetic members arranged to provide six magnetic fields. Each stage is arranged in one cylinder, with the first stage provided on the cold side of the magnetic heat pump 7, in contact with cold heat exchanger 25 of the heat pump, and the second stage provided on the warm side of the magnetic heat pump 7, in contact with hot heat exchanger 27 of the heat pump.

Furthermore, the heat pump 7 differs from that specifically described in the aforementioned WO 2009/087310 A2 document in that the magnetocaloric members/elements each comprise four different types of magnetocaloric material. These different types of material are arranged side-by-side in a stacked configuration. The types of magnetocaloric material provided in one stage are different to those provided in the other of the two stages, as is explained more fully below.

In the low temperature stage (i.e. the stage in contact with cold heat exchanger 25 of the heat pump), magnetocaloric materials of Type 1; Type 2; Type 3; and Type 4 (as shown FIG. 8 and mentioned above) are stacked side-by-side.

As indicated above, the heat exchanger 25 comprises a fluid circuit (not shown) for transporting an internal fluid heat carrier, thereby providing thermal communication between the magnetocaloric material and the first fluid circuit 13. Driven by the pistons of the mini-generators of the first stage, the internal fluid heat carrier of the first stage of the magnetic heat pump 7 flows alternatively in opposite directions through the magnetocaloric materials of the first stage. The arrangement of magnetocaloric materials is such that, when the respective magnetocaloric members/elements are subjected to a magnetic field, the flow is in a first direction as follows:

From a cold chamber associated with the cold heat exchanger 25,
-> through the magnetocaloric material of Type 1,
-> then through the magnetocaloric material of Type 2,
-> then through the magnetocaloric material of Type 3,
-> then through the magnetocaloric material of Type 4,
-> then to a middle chamber located between the two stages.

When the respective magnetocaloric members/elements are not subjected to a magnetic field, the flow is in a second direction, opposite to the first direction:

From the middle chamber
-> through the magnetocaloric material of Type 4,
-> then through the magnetocaloric material of Type 3,
-> then through the magnetocaloric material of Type 2,
-> then through the magnetocaloric material of Type 1,
-> then to the cold chamber associated with the cold heat exchanger 25.

In the high temperature stage (i.e. the stage in contact with hot heat exchanger 27 of the heat pump), magnetocaloric materials of Type 5; Type 6; Type 7; and Type 8 (as shown FIG. 8 and mentioned above) are stacked side-by-side.

As indicated above, the heat exchanger 27 comprises a fluid circuit (not shown) for transporting an internal fluid heat carrier, thereby providing thermal communication between the magnetocaloric material and the second fluid circuit 15. Driven by the pistons of the mini-generators of the second stage, the internal fluid heat carrier of the second stage of the magnetic heat pump 7 flows alternatively in opposite directions through the magnetocaloric materials of the second stage. The arrangement of magnetocaloric materials in the second stage is such that, when the respective magnetocaloric members/elements are subjected to a magnetic field, the flow is in a first direction as follows:

From the middle chamber
-> through the magnetocaloric material of Type 5,
-> then through the magnetocaloric material of Type 6,
-> then through the magnetocaloric material of Type 7,
-> then through the magnetocaloric material of Type 8,
-> then to the warm chamber associated with the hot heat exchanger 27.

When the respective magnetocaloric members/elements are not subjected to a magnetic field, the flow is in a second direction, opposite to the first direction:

From the warm chamber associated with the hot heat exchanger 27,
-> through the magnetocaloric material of Type 8,
-> then through the magnetocaloric material of Type 7,
-> then through the magnetocaloric material of Type 6,
-> then through the magnetocaloric material of Type 5,
-> then to the middle chamber.

This arrangement allows for sufficient power and temperature span to cool (i) the milk produced from one milking robot, without precooling, or (ii) the milk received in a 4 milkings tank of 1200 liters, without precooling (as according to standard EN13732)

It will be understood that the performance (e.g. cooling capacity) of the heat pump 7 may be varied by varying the number (NR) of mini-generators, number (X) of stages/modules, and/or the number of different types of magnetocaloric material stacked in a stage and the types of magnetocaloric material used. If power is increased in a modular way (i.e. by increasing the number of stages/modules), then several stages/modules (or, indeed, heat pumps 7) could be constructed together and optionally driven by the same motor.

Use of the heat pump 7 in the context of the embodiments illustrated herein will now be described.

Firstly, a quantity of milk is loaded into the tank 5. The temperature of this milk will vary depending upon ambient temperature conditions, and, even without precooling, may be, for example, between 5° C. and 25° C. The milk must be cooled to below 4° C., for example, to 3° C. The heat pump 7 is then initially started without the two fluid pumps 17,19 running. The magnetocaloric materials are thereby exposed to ambient temperature. There will be no external thermal exchange in the cold heat exchanger 25 or in the hot heat exchanger 27 of the heat pump 7.

After a short period of time (for example, after approximately 15 to 60 seconds), a number of cycles of the heat pump 7 will be completed. For example, with a 9 Hz heat pump having six magnetic areas in one revolution, and turning at 90 rpm, five hundred and forty cycles (9×60=540 cycles) will be achieved after one minute. At this stage, the cold chamber associated with the cold heat exchanger 25 will be at a temperature close to the Curie point of the Type 1 magnetocaloric material (−4° C.), and the warm chamber associated with the hot heat exchanger 27 will be at a temperature close to the Curie point of the Type 8 magnetocaloric material (+57).

The two fluid pumps 17,19 are then started.

The liquid circulating in the first fluid circuit 13 will now be at a temperature between the temperature of the milk contained in the tank 5 and the temperature of the cold chamber, and so a heat exchange is possible.

The heat is transferred from the milk to the "cold liquid" circulating in a pipe arrangement of the first fluid circuit 13. This heat transfer may, for example, increase the temperature of the cold liquid from 0° C. to 3° C. Then, in the cold heat exchanger 25,21 the heat originating from the milk is transferred to the internal liquid in the cold chamber of the magnetic heat pump 7, which is at a lower temperature, for example, minus 4° C. to 0° C. When the magnetocaloric materials are subjected to the magnetic field, this heat is transferred from the cold chamber through to the Type 1 magnetocaloric material. The Type 1 magnetocaloric material is thereby heated to a temperature in the working range of the Type 2 magnetocaloric material and heat is transferred to the internal fluid in contact with the Type 2 magnetocaloric material. The same thermal transfer process then occurs in relation to the Type 3 and Type 4 magnetocaloric materials. Heat is then transferred to the middle chamber.

The pistons mix the internal fluid in the middle chamber between with the two stages, and the heat originating from the milk is further gradually transferred through the Type 5, 6, 7 and 8 magnetocaloric materials so as to produce progressively higher temperatures. This heat energy is finally transferred at a highest temperature (for example, of about 50° C.) to the warm chamber.

This heat is then transferred through the heat exchangers 27/23 to fluid circulating at a lower temperature (of, for example, around 45° C.) through the pipe arrangements of the second fluid circuit 15. The heat energy is finally transferred to the ambient air by means of the ambient heat exchanger 33 (which includes a fan 37 for blowing ambient air over a part 35 of the second fluid circuit 15).

Alternatively, as the warm fluid is cooled by the air in the ambient heat exchanger 35, it can be considered that all the fluids are cooled by the heat pump when the magnetocaloric materials are not subjected to a magnetic field, from the heat exchangers 23/27, to the warm chamber, through the Type 8, 7, 6 and 5 magnetocaloric materials and then through the middle chamber, and then through the Type 4, 3, 2 and 1 magnetocaloric materials and then to the cold chamber and then to the heat exchanger 25/21 and then cooling back the liquid circulating through the pipe arrangement 13, at a temperature lower than the milk temperature in tank 5, for cooling the milk through the heat exchanger 29.

The types of magnetocaloric material selected, especially in the low temperature range, is crucial in order to achieve effective cooling by having the cold liquid circulating at a temperature below the lowest required temperature of the milk in the tank, whilst nevertheless avoiding temperatures which are so low as to result in milk freezing at the surface of the cold heat exchanger 29 of the milk tank 5. The chosen Type 1 magnetocaloric material is a good compromise in this respect.

Compared to current refrigerant gas cooling systems, it is noticeable that the power/effectiveness of the magnetic heat pump will be drastically reduced below −10° C. to −15° C. when the liquid is out of the operating range of the Type 1 magnetocaloric material, and this provides an effective safeguard for avoiding freezing of the milk on the tank heat exchanger 29.

A number of modifications to the apparatus 1 shown in FIG. 1*b* may be made as shown in FIGS. 2 to 6 of the accompanying drawings.

Figure 2A:
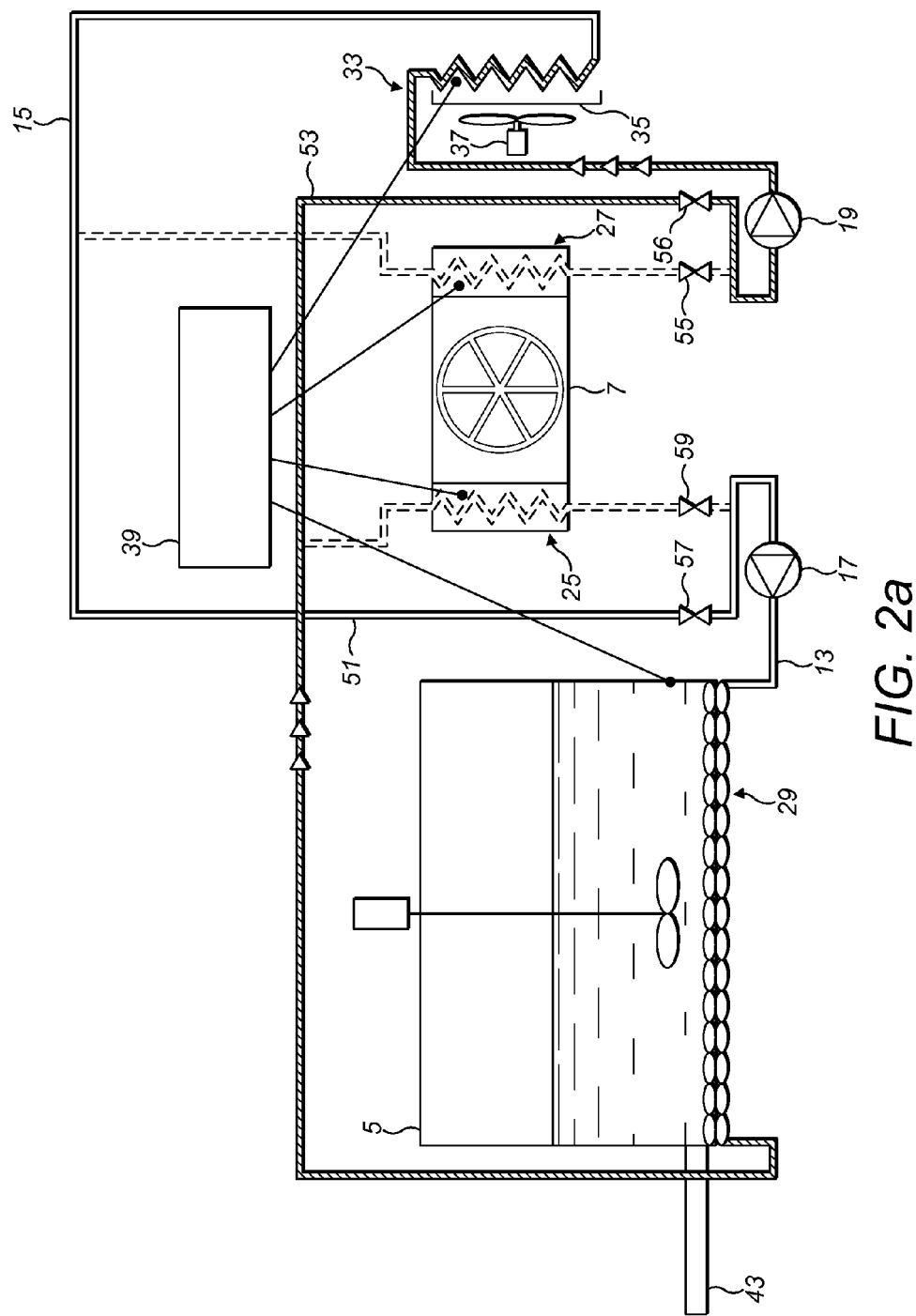
FIG. 2a is a schematic hydraulic diagram of the embodiment shown in FIG. 1 modified so as to allow for operation in cold ambient conditions without use of the magnetic heat pump (i.e. natural cooling), wherein heat exchangers which operate to transfer heat to and from the heat pump are bypassed.
Figure 2B:
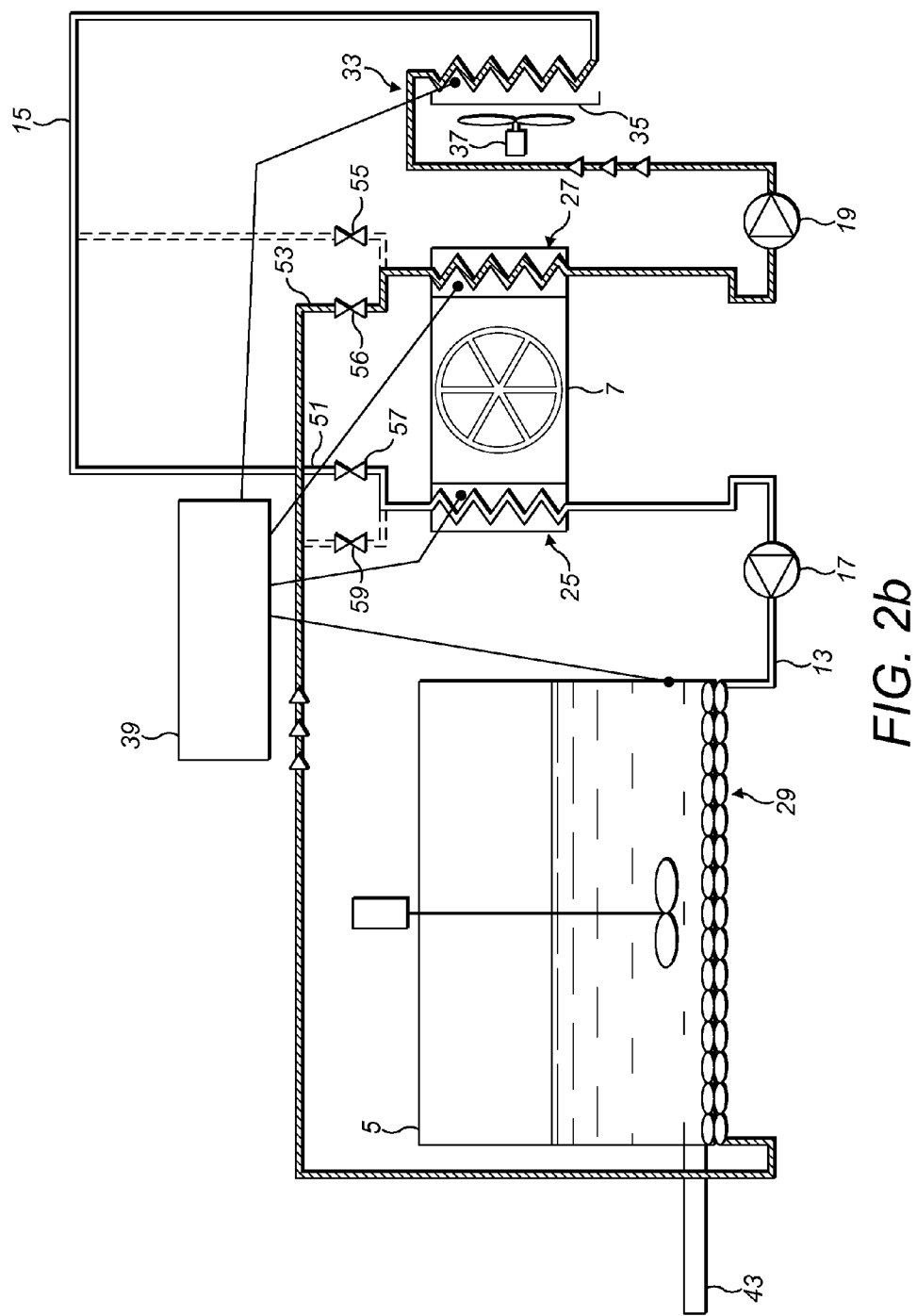
FIG. 2b is a schematic hydraulic diagram of the embodiment shown in FIG. 1 modified so as to allow for operation in cold ambient conditions without use of the magnetic heat pump (i.e. natural cooling), wherein heat exchangers which operate to transfer heat to and from the heat pump are utilised.

The modifications shown in FIGS. 2*a* and 2*b* allow for operation in cold ambient conditions without the use of the magnetic heat pump (i.e. natural cooling).

Regarding the modification shown in FIG. 2*a*, it will be understood that first and second connecting fluid circuitry 51,53 is provided for allowing the first and second fluid circuits 13,15 to be selectively connected to one another to form a single closed loop circuit which bypasses the magnetic heat pump 7 and the two heat exchangers 25,27 associated therewith. Use of the additional connecting fluid circuitry 51,53 may be selected by operation of four valves 55,56,57,59. These valves selectively restrict (and preferably prevent) and permit a flow of fluid. The valves 55,56,57,59 are solenoid valves operable by the electronic control system 39. The first and second fluid circuits 13,15 are connected to one another as mentioned above by arranging valves 56,57 (positioned in the second and first connecting circuitry 53,51 respectively) in an open configuration to allow the passage of fluid therethrough, whilst the remaining two valves 55,59 are arranged in a closed configuration in order to prevent a passage of fluid therethrough (and, as a consequence, to prevent flow through the two heat exchangers 27,25 respectively). Furthermore, the location of the valves 55,56,57,59 is such that one or the other, or both, of the pumps 17,19 are used to pump fluid through the single closed loop circuit. The pressure drop across the cold and hot heat exchangers 29,33 may be monitored and may determine which of the two pumps is used or whether both pumps are used. This monitoring and determination, and the consequential control of the valves, may be undertaken automatically (i.e. without human intervention) by the electronic control system 39.

The second modification providing for natural cooling is shown in FIG. 2*b*. This modification is similar to that of FIG. 2*a* in that the first and second fluid circuits 13,15 may again be selectively connected to one another to form a single closed loop circuit by means of the electronic control system 39. However, in this instance, the first and second connecting fluid circuitry 51,53 and the four valves 55,56,57,59 are arranged so that the two heat exchangers 25,27 associated the magnetic heat pump 7 form part of the closed loop circuit.

It should be noted that, in the embodiments of FIGS. 2*a* and 2*b*, the combined function of the two valves 57,59 could alternatively be provided by a single three-way valve and/or the combined function of the two valves 55,56 could alternatively be provided by a single three-way valve.

It will be understood that the arrangements of FIGS. 2*a* and 2*b* allow milk in the tank 5 to be cooled using a combination of the tank heat exchanger 29 and the ambient heat exchanger 33 without use of the magnetic heat pump 7. This mode of operation is of particular use when milk and ambient temperatures are such that the magnetic heat pump is required to operate outside its temperature operating range. In these circumstances, the magnetic heat pump will fail to operate. Typically, this mode of operation may be used in response to the temperature of said ambient fluid becoming less than the temperature of the fluid stored in the tank (5) by a predetermined value. The predetermined value may be between 10° C. to 15° C. and may be 10° C. (for example, when ambient temperature is approximately 5° C. to 15° C. and the temperature of milk in the tank is above 25° C.). The mode of operation may revert to the original mode in response to the temperature of said ambient fluid becoming greater than the temperature of the fluid stored in said tank (5) by a predetermined value. The predetermined value may be between 10° C. to 15° C. and may be 10° C. The change between modes may be effected automatically (i.e. without human intervention) by means of the electronic control system 39.

In this regard, a peculiarity of bulk milk cooling is that, after each time the tank is emptied and cleaned (every day, or every second or third day), fresh warm milk is introduced into the tank. Without precooling, this milk is introduced into the tank at a temperature of around 35° C. As a result, when starting the milk cooling, the milk in the tank will frequently be at a temperature from 25° C. to 35° C.

As a consequence, liquid circulating in the first fluid circuit 13 and tank heat exchanger of the first embodiment (see FIG. 1*b*) can be at a temperature higher than the operating temperature ranges of magnetocaloric material Types 1, 2, 3 and 4. Starting the operation of the magnetic heat pump 7 can then be difficult in the cold side, even with the precautions for starting stated previously.

The same can happen on the warm side. For example, in winter, if the ambient heat exchanger 33 is located in an area where the temperature is below 10° C., then the liquid circulating through the second fluid circuit 15 can be at a temperature lower than the operating temperature ranges of magnetocaloric material Types 5, 6, 7 and 8, and then starting the operation of the magnetic heat pump 7 will be difficult in the warm side.

If both phenomena act at the same time, then there can be a reversal of the required temperature differentials when starting the magnetic heat pump 7. In order to correctly start the heat pump 7, it would be necessary to stop or at least reduce the speed of the fluid circuit pumps 17,19.

The natural cooling provided by the arrangements of FIGS. 2*a* and 2*b* solves these problems.

Advantageously, the arrangement of FIG. 2*b* allows for the following prior to starting the magnetic heat pump 7:

The heat exchanger 25 and cold water chamber of the heat pump 7 can be pre-cooled by liquid in the single closed loop circuit after the thermal contact of said liquid with cold air (by means of the ambient heat exchanger 35).

The heat exchanger 27 and hot chamber of the heat pump 7 can be pre-heated by liquid in the single closed loop circuit after the thermal contact of said liquid with warm milk (by means of the tank heat exchanger 29).

So, both heat exchangers 25,27 are then more likely to be at temperatures in the range of the magnetocaloric materials close to them, and this will allow the heat pump 7 to start more readily.

In addition, during this time of operation, the motor driving the magnetic heat pump 7 will be stopped, and the related energy requirements will be spared, which will reduce the running costs.

Figure 3:
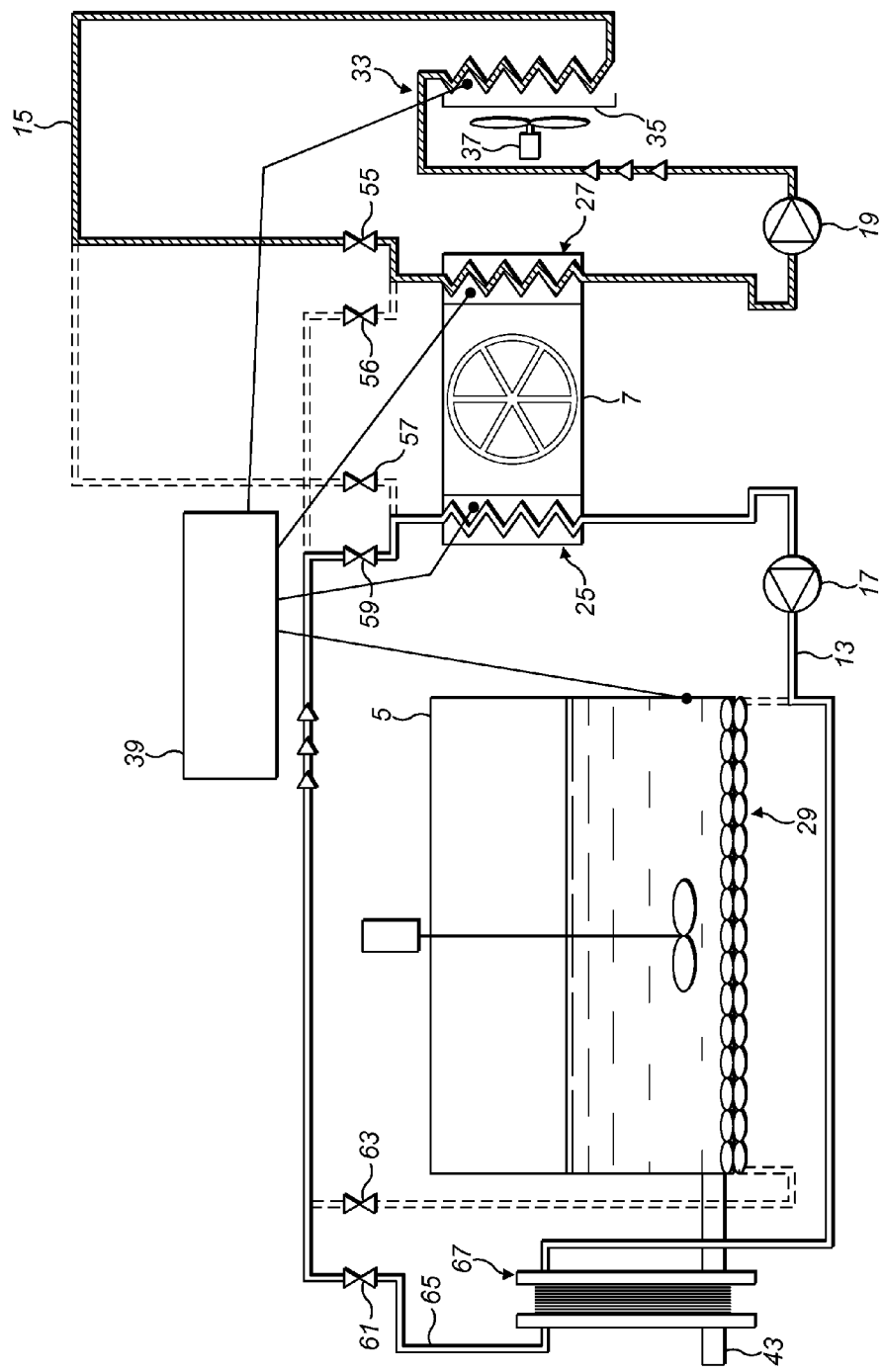
FIG. 3 is a schematic hydraulic diagram of the embodiment shown in FIG. 1 modified so as to allow a pre-cooling and/or instant cooling of fresh milk entering the tank.

The apparatus shown in FIG. 3 is a development of the apparatus shown in FIG. 2b.

The apparatus of FIG. 3 differs from that of FIG. 2b in that two additional solenoid activated valves 61,63 are added, together with an additional line 65 of fluid circuitry forming an alternative fluid pathway in the first fluid circuit 13. These valves selectively restrict (and preferably prevent) and permit a flow of fluid. The use of the additional line 65 is selected through operation of said two additional valves 61,63.

A part of the additional line 65 of fluid circuitry forms part of a further heat exchanger 67. The further heat exchanger 67 is positioned relative to the inlet pipe(s) 43 of the tank 5 so as to allow for thermal communication between milk in the inlet pipe(s) 43 and fluid in the additional line 65 of fluid circuitry. The additional line 65 extends the first fluid circuit 13 of the arrangement shown in FIG. 1b. Valves 61 and 63 are configured so as to be capable of selectively diverting fluid in the first fluid circuit 13 from the tank heat exchanger 29 to the inlet pipe heat exchanger 67. When diverting fluid in this way, the first additional valve 61 is opened to allow the passage of fluid therethrough, and the second additional valve 63 is closed to prevent the passage of fluid therethrough. Milk entering the tank 5 via the inlet pipe(s) 43 may be thereby cooled prior to entering the tank 5. The milk in the inlet pipe(s) 43 may therefore be cooled from a temperature of approximately 35° C. to a lower temperature of, for example, between 20° C. and 3° C. The valves 61,63 may be automatically controlled by the electronic control system 39. The operation of the two valves 61,63 may be such that fluid in the first fluid circuit 13 is directed to the inlet pipe heat exchanger 67 only when fresh milk is being newly introduced into the tank 5 via the inlet pipe(s) 43.

Accordingly, when fresh milk is not being introduced into the tank 5, fluid in the first fluid circuit 13 is directed solely through the tank heat exchanger 29 as in the arrangement of FIG. 1b. Alternatively, the additional valves 61,63 may be operated (i.e. both opened, each one either fully or partially) so as to direct fluid in the first fluid circuit 13 to both the inlet pipe heat exchanger 67 and the tank heat exchanger 29. The degree to which fluid in the first fluid circuit 13 is biased to the two heat exchangers 67,29 may be determined upon the cooling requirements of milk in the inlet pipe(s) 43 versus the cooling requirement of milk in the tank 5. This determination, and/or the monitoring of milk temperatures in order to allow said determination, may be made automatically (i.e. without human intervention) by means of the electronic control system 39.

It will be appreciated that the valves 55,56,57,59 of the arrangement shown in FIG. 3 may be operated as described in relation to the arrangement of FIG. 2b so as to allow for a natural cooling of milk. The valve 61,63 may nevertheless still operate as described.

Although not shown, the arrangement of FIG. 2a can be modified in exactly the same way as the arrangement of FIG. 2b has been modified in FIG. 3, with the provision of two additional solenoid activated valves 61,63 together with an additional line 65 of fluid circuitry forming an alternative fluid pathway in the first fluid circuit 13.

It should be noted that, in the aforementioned modified embodiments of FIGS. 2a and 2b, the combined function of the two valves 61,63 could alternatively be provided by a single three-way valve.

It should be also noted that, in FIG. 3, the two additional valves 61,63 are positioned downstream of the inlet heat exchanger 67 and the tank heat exchanger 29 respectively. In an alternative embodiment (not shown), the two additional valves 61,63 are positioned upstream of the inlet heat exchanger 67 and the tank heat exchanger 29 respectively, just downstream of the T piece of line 13 (see FIG. 3) which itself is located immediately downstream of the pump 17.

Figure 4:
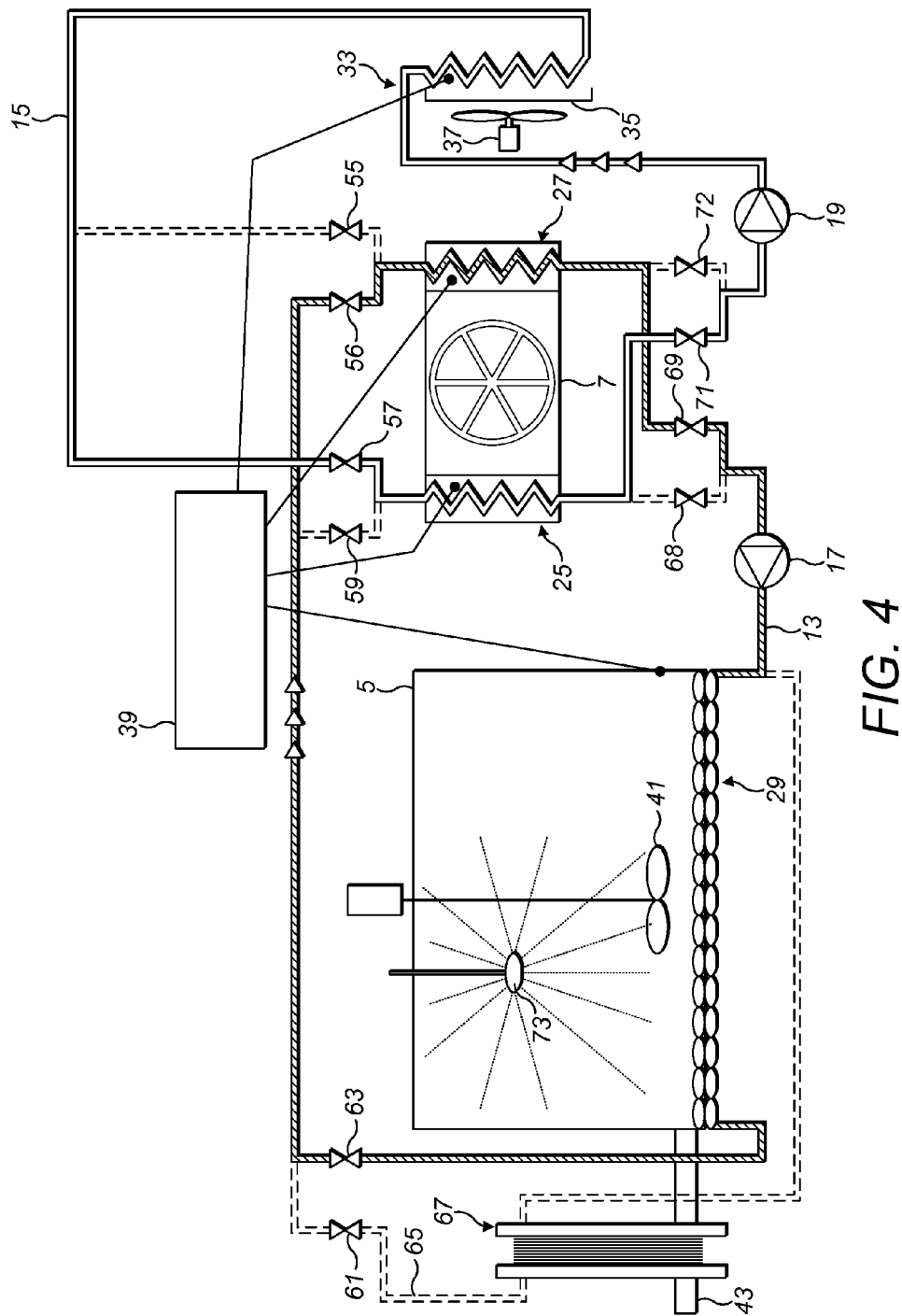
FIG. 4 is a schematic hydraulic diagram of the embodiment shown in FIG. 3 modified so as to allow reversal of the refrigeration cycle and thereby allow the tank, or the tank inlet pipe(s), to be heated for cleaning or other purposes.

A further modification is shown in FIG. 4 of the accompanying drawings wherein the arrangement of FIG. 3 has been modified to include yet further solenoid operated valves (for opening/closing lines of fluid circuitry) and further lines of fluid circuitry. The valves are moveable between the open and closed configurations by means of the electronic control system 39.

More specifically, the arrangement of FIG. 4 further includes:
- a valve 68 located in a part of the first fluid circuitry 13 positioned upstream of the first pump 17 between said first pump 17 and the cold heat exchanger 25 of the heat pump 7;
- a valve 72 located in a part of the second fluid circuitry 15 positioned upstream of the second pump 19 between said second pump 19 and the hot heat exchanger 27 of the heat pump 7;
- a further line of fluid circuitry positioned upstream of the first pump 17 and fluidly connecting the first pump 17 to the hot heat exchanger 27 of the heat pump 7, wherein said further line is provided with a valve 69; and
- a further line of fluid circuitry positioned upstream of the second pump 19 and fluidly connecting the second pump 19 to the cold heat exchanger 25 of the heat pump 7, wherein said further line is provided with a valve 71.

The valves 68,69,71,72 selectively restrict (and preferably prevent) and permit a flow of fluid. The arrangement allows the refrigeration cycle of the magnetic heat pump to be effectively reversed. As a consequence, the tank heat exchanger 29 and/or the inlet pipe heat exchanger 67 may operate to heat fluid in the tank 5 and the inlet pipe(s) 43. This is of particular use when cleaning the inlet pipe(s) 43 and the tank 5 with cleaning fluids (for example, water and detergent). The specific arrangement of the further circuitry and valves 68,69,71, 72 will also be apparent to a reader skilled in the art from a comparison of the two circuit diagrams provided by FIGS. 3 and 4.

When valves 56, 57, 69 and 71 are open and valves 55, 59, 68 and 72 are closed, the system of FIG. 4 is configured to provide a reverse cycle for heat cleaning purposes.

When valves 56, 57, 69 and 71 are closed and valves 55, 59, 68 and 72 are open, the system of FIG. 4 is configured provide a standard cycle for cooling as discussed in relation to FIGS. 1b and 3.

This combination of valve configurations is achieved through automated operation of the valves 55, 56, 57, 59, 68, 69, 71, 72 by means of the electronic control system 39.

In alternative embodiments, pairs of valves (as shown in FIG. 4) are replaced by three-way valves. In this regard, each of the following valve pairs may be replaced by a three-way valve:

First alternative embodiment: valves 55 and 56, valves 57 and 59, valves 68 and 69, and valves 71 and 72

Second alternative embodiment: valves 55 and 57, valves 56 and 59, valves 69 and 72, and valves 68 and 71

In relation to FIG. 4, it will be understood that, in each of the above valve pairs, one valve is open while the other is closed, in both heating and cooling configurations.

The reverse cycle provided by the arrangement of FIG. 4 is of particular use after refrigerated milk has been collected from the tank 5 and the interior of the tank 5 needs to be cleaned. As discussed below, tank can be manually cleaned or automatically cleaned.

When a tank is manually cleaned (as is generally the case for open tank types), the farmer initially introduces some water into the tank in order to rinse it. This water is then drained. Then he introduces some hot water into the tank, with the addition of some cleaning agents (either basic detergents or acids). In prior art systems, this cleaning water needs to be hot, generally by using hot water from a water boiler or from a heat recovery system. Then, the farmer brushes the tank inner surface with this cleaning water.

A good cleaning of a tank is generally dependent upon four factors:
 chemical action (from the detergents, or other products, added to the water)
 mechanical action (for example, brushing)
 time
 thermal action Depending on the type of detergent used, the temperature of the cleaning water inside the tank is generally required to be greater than 45° C.

After the main cleaning, the cleaning water is drained, and the tank is rinsed with clean water.

Figure 5:
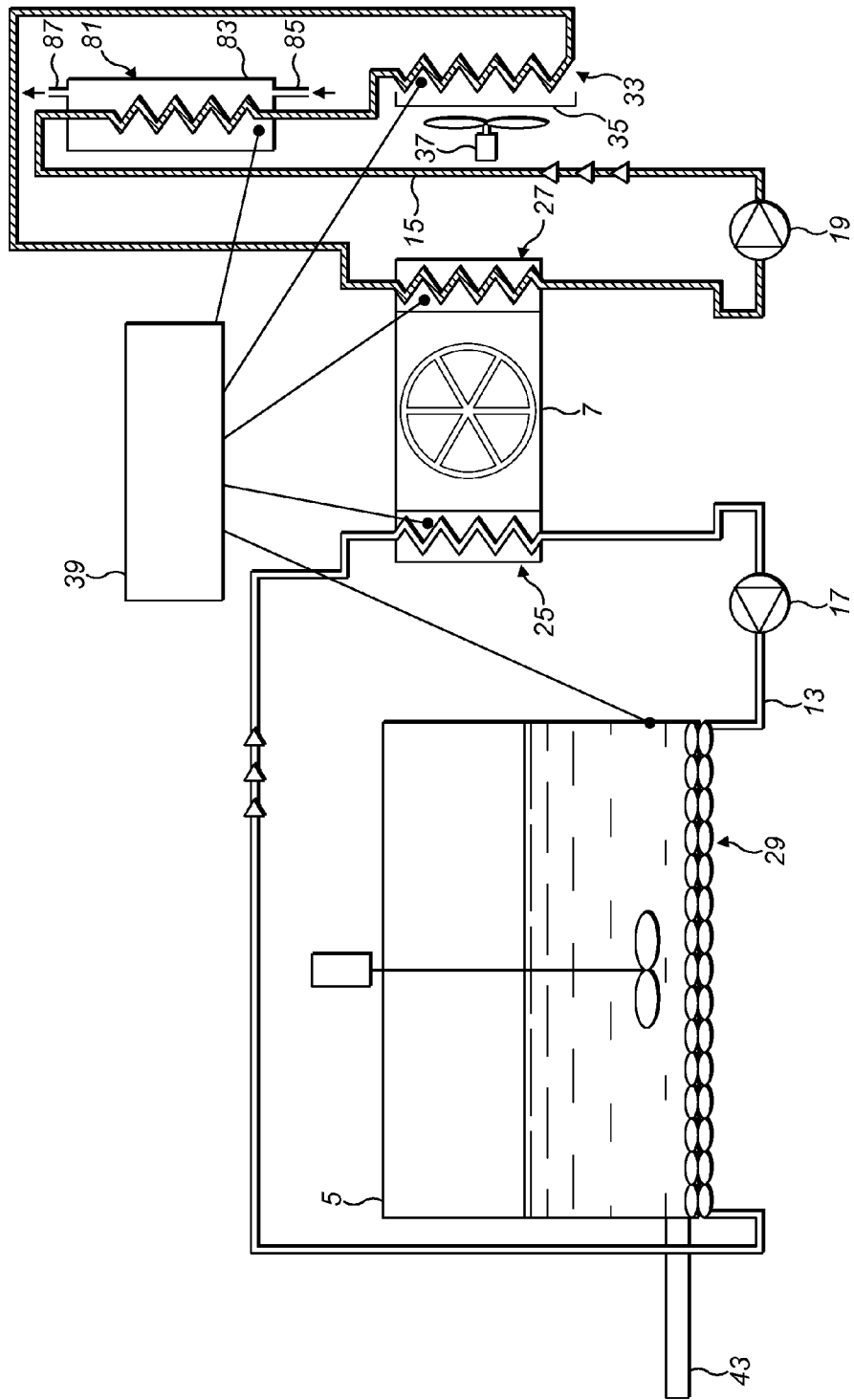
FIG. 5 is a schematic hydraulic diagram of the embodiment shown in FIG. 1 modified so as to allow recovery of heat from the magnetic heat pump for secondary use (series arrangement)
Figure 6:
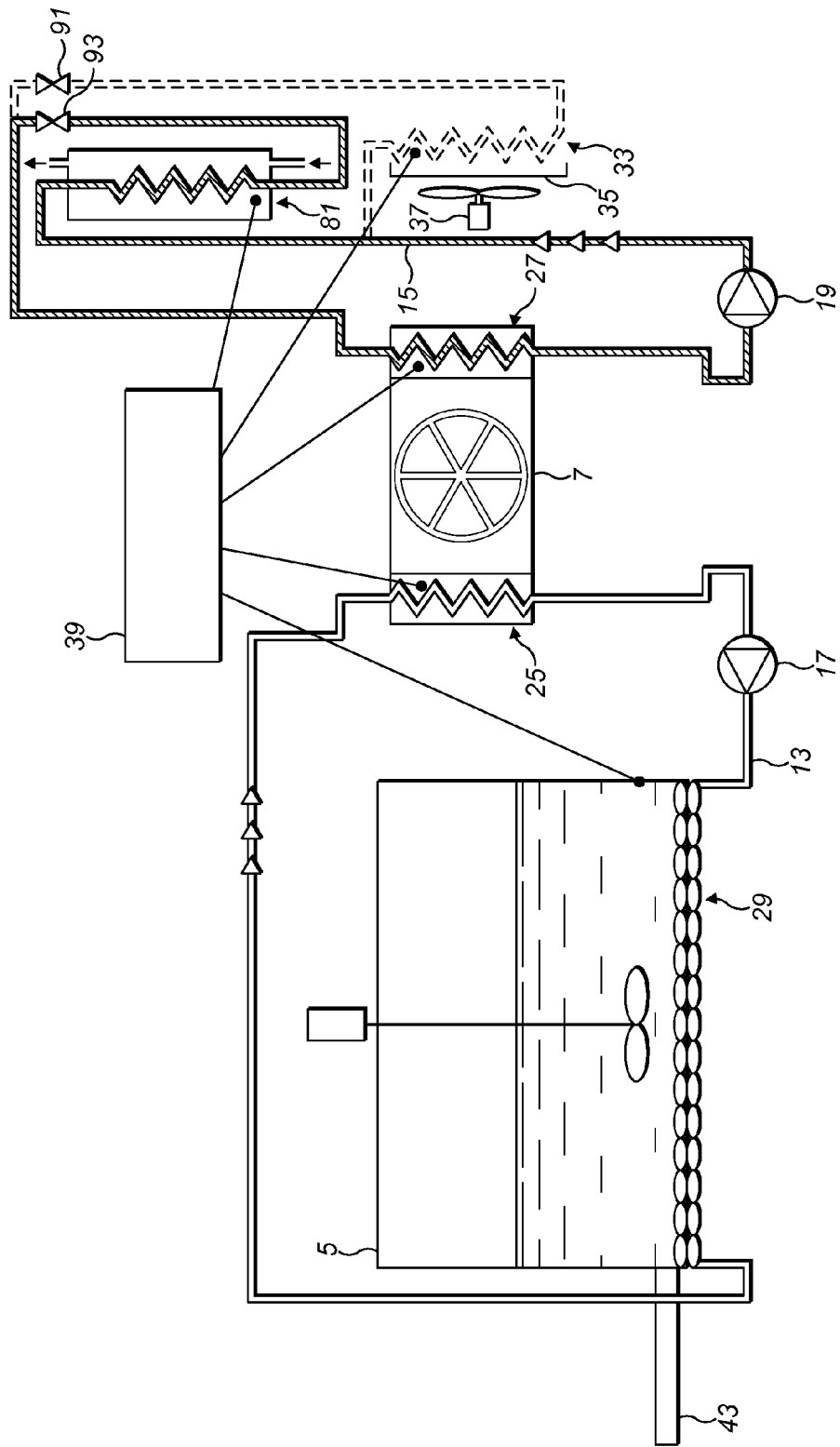
FIG. 6 is a schematic hydraulic diagram of the embodiment shown in FIG. 1 modified so as to allow recovery of heat from the magnetic heat pump for secondary use (parallel arrangement)

With the system shown in FIG. 4, if the temperature of the cleaning water inside the tank is not sufficient (which may be the case if, for example, the farmer does not have a heat recovery system as shown FIGS. 5 and 6 or any other effective water heating system, or he has only a partially effective water heating system such as a solar powered water heater), then the farmer can start the magnetic heat pump in order to heat the tank 5 interior surfaces and also the cleaning water in the tank 5. Then, in a similar way as described above for operating the heat pump for cooling purpose, the heat from the ambient air is transferred via the ambient heat exchanger 35 to the liquid circulating in the fluid circuit associated with the ambient heat exchanger 35 (which is at a lower temperature) and pumped to the cold side of the magnetic heat pump 7. This heat is gradually transferred via the cold heat exchanger 25 to the internal liquid of the cold chamber, and then to the fluid passing through magnetocaloric material Type 1, and transferred through magnetocaloric materials Type 2, Type 3 and Type 4 to the middle chamber at a higher temperature, and then through magnetocaloric material Types 5, 6, 7 and 8 to the warm chamber, at a yet higher temperature. By means of the hot heat exchanger 27, this heat is communicated at a higher temperature, close to the Curie point of the magnetocaloric material Type 8, to the liquid circulating in the fluid circuit associated with the tank heat exchanger 29. This heat is finally transferred to the surfaces of the tank 5 and the cleaning water inside the tank through the tank heat exchanger 29, with the help of the agitator 41, and optionally by means of the inlet heat exchanger 67 (see below for a transfer of heat solely by means of the heat exchanger 67).

It is noted that this system can lead to a reduction in the quantity of water needed in a farm for cleaning purpose. This is because the interior surfaces of the tank 5 (in particular, the base of the tank 5, and/or the walls of the tank 5 depending on the location of the tank heat exchanger 29) may be heated directly by the fluid pumped from the magnetic heat pump through the tank heat exchanger 29. Unlike the prior art method, an external source of heated water is not therefore required to raise the temperature of the tank surfaces from the refrigeration temperature (of approximately 3° C.) to a final cleaning temperature of more than 45° C. Only an external source of cleaning water is then required for spreading and brushing the detergent solution on the tank wall and for subsequent rinsing. A reduced amount of water is needed because the heating water (in the fluid circuitry) remains separate from the cleaning water. In the prior art method, the heating water and the cleaning water are the same. Also, the system of FIG. 4 reduces heating costs and improves efficiency. Regarding the improved efficiency, instead of using an electrical boiler having a Coefficient of Performance (COP) of approximately 1 (1 kWh of heated water needs 1 kWh of electricity), the system of FIG. 4 uses the magnetic heat pump 7 which can provide a much higher COP (the expected performance being 4 to 4.5, which provides 4 to 4.5 kWh of heated water from only 1 kWh of electricity).

When a tank is automatically cleaned (as is generally the case for closed tank types), the operational steps described above in relation to the prior art manual cleaning are performed automatically under the control of an electronic programmer. This is quite similar to the operation of a domestic dish washer. The rinsing water is first pumped to the tank by means of automatically operated valves and a spraying device. Then this water is drained, generally with an automatic drain valve or with a pump. The cleaning water is then introduced, with required detergents or acid products added. Generally, this is hot water prepared in a water boiler using electricity, preferably during the night at low cost electricity rates.

The prior art systems either require large quantities of water in order to heat up the inner tank surface and allow for successive subsequent rinses using hot water, or they include an in-line water heater which allows cleaning water in the tank to be heated as it is circulated by a cleaning pump. This heater is costly and needs to consume electricity at the time when the cleaning occurs, which is often during times of high cost electricity rates. Once heated, the water is sprayed onto the tank interior surfaces with a spraying device. The brushing of the manual process is therefore replaced in the automated process by a spraying action. Finally, the tank is drained, and rinsed.

The system shown FIG. 4 can favourably obviate the need for an in-line heater, as described above, through use of the magnetic heat pump 7, which can be operated automatically by means of an electronic controller 39 including an electronic cleaning programmer for controlling the cleaning cycle. During the cleaning, the magnetic heat pump 7 is operated, together with the fan 37 and the pumps 17,19, and thereby heats interior surface (the base) of the tank 5. The cleaning fluid introduced into the tank is then heated on the tank base and recirculated by a cleaning pump (not shown) so as to be drained from the tank 5 and dispensed back into the tank 5 via the spraying device 73. Alternatively, a further in-line heat exchanger could be provided in a modification to the system of FIG. 4 whereby fluid pumped from the hot heat exchanger 27 is directed to said in-line heat exchanger for heating cleaning fluid prior to said fluid being introduced into the tank 5 via the spray device 73. With use of the in-line heat exchanger, cleaning fluid does not need to be heated in the tank 5 itself and so the fluid circuitry may be such as to allow the fluid from the hot heat exchanger 27 to bypass the tank heat exchanger 29 and/or the inlet heat exchanger 67. The agitator 41 may be cleaned and used to aid cleaning as necessary.

Advantages of the system of FIG. 4 include its low use of water and electricity. The system may also be provided as a relatively inexpensive modification to the systems of FIGS. 1b and 3.

In addition to tank cleaning, it will be understood that the milking machinery, tank inlet pipe(s), and connecting milk lines (the milk line circuitry) need to be periodically cleaned. In the prior art, this may involve disconnecting the tank inlet pipe(s) from the tank.

The cleaning operation may be controlled automatically by an electronic programmer. Cleaning water and rinsing water is successively circulated through the milk line circuitry, from the milking machine to the inlet pipe, and back to a container close to the milking machine. The cleaning needs are similar to those of the tank. Accordingly, cleaning water is circulated through the milk line circuitry at relatively high temperatures, normally above 45° C.

In cold ambient conditions, it can be difficult to achieve and/or maintain temperatures above 45° C., especially if the milk line circuitry is long because the water cools along its way to the tank inlet. The basic requirement for a good cleaning is therefore not met.

In the arrangement of FIG. 4, when the milk line circuitry needs to be cleaned, cleaning water is circulated through it, including the pipe inlet(s) 43 and the milk side of the inlet pipe heat exchanger 67, with the valves 63, 59, 55, 68 and 72 closed and the valves 61, 57, 56, 69, 71 opened, and with the magnetic heat pump 7 being operated together with the fan 37 and the two circuit pumps 17,19.

The heat from the ambient air is transferred to the cleaning water circulating in the inlet pipe(s) 43 via the heat exchanger 67 as described above. This process boosts the cleaning temperature at the tank end of the milk line circuitry, leading to better quality cleaning, and to a reduction of the heating costs for heating the cleaning water, since the COP of the magnetic heat pump 7 is comparatively high.

It will further be understood that the refrigerated milk stored in the refrigeration tank may be heated at an appropriate time after milking. Milk may be heated in the same way as the fluid is heated in the above described cleaning operation. The milk may be heated in a process for producing cheese or other varieties of milk product (for example, yoghurt or ricotta). After the milk is heated, it would typically be mixed with yeast to produce the required milk product.

A modification to the arrangement of FIG. 1b is shown in FIG. 5. The modification introduces a further heat exchanger 81 in line (i.e. in series) with and upstream of the ambient heat exchanger 33. The further heat exchanger 81 allows for recovery of heat from the "warm side" of the magnetic heat pump 7. In the arrangement of FIG. 5, the further heat exchanger 81 operates as a boiler and comprises a water tank 83 having a water inlet 85 at the bottom thereof and a water outlet 87 at the top thereof. Water (a secondary use fluid) to be heated flows through the heat exchanger 81 from the inlet 85 to the outlet 87 and is thereby placed in thermal communication with the second fluid circuit 15 and heated. The heated water exiting the outlet 87 may be subsequently used for domestic purposes or, for example, for the cleaning needs of a farm.

It will be appreciated that the electronic control system 39 may monitor the temperature of the water being heated within the heat exchanger 81 and/or the temperature of the water exiting the heat exchanger 81. In response to the measured temperature, the electronic control system 39 may vary the speed of the fan 37 so as to increase or decrease the heat transferred from the second fluid circuit 15 to the water in the heat exchanger 81. The fan 37 may be stopped in order to maximise the heating capacity of the heat exchanger 81 for a given output of the magnetic heat pump 7.

A variation of the modification provided in FIG. 5 is shown in FIG. 6 of the accompanying drawings. In FIG. 6, rather than providing the further heat exchanger 81 in series with the ambient heat exchanger 33, the further heat exchanger 81 is provided in parallel with the ambient heat exchanger 33. A first solenoid operated two-way valve 91 controls fluid flow (in the second fluid circuit 15) to the ambient heat exchanger 33. Also, a solenoid operated two-way valve 93 controls fluid flow (within the second fluid circuit 15) to the further heat exchanger 81. The two valves 91,93 may, in an alternative embodiment, be replaced with a single three-way valve. The or each valve 91,93 controlling flow to the heat exchangers 33,81 is controlled automatically by the electronic control system 39. As such, if the water being heated in the heat exchanger 81 has reached a required temperature, then fluid in the second fluid circuit 15 may be directed entirely to the ambient heat exchanger 33. If said water is below the required temperature, then the control valves 91,93 may be operated to direct fluid in the second fluid circuit 15 entirely to the further heat exchanger 81. Fluid in the second fluid circuit may be directed to both of said heat exchangers 33,81 to control the rate at which water in the heat exchanger 81 is heated.

The two valves 91,93 (or one three-way valve) shown in FIG. 6 are located downstream of the heat exchangers 33,81 but in an alternative embodiment they can be located upstream of the heat exchangers 33,81 and thereby achieve the same control. The valves 91,93 selectively restrict (and preferably prevent) and permit a flow of fluid.

Figure 7:
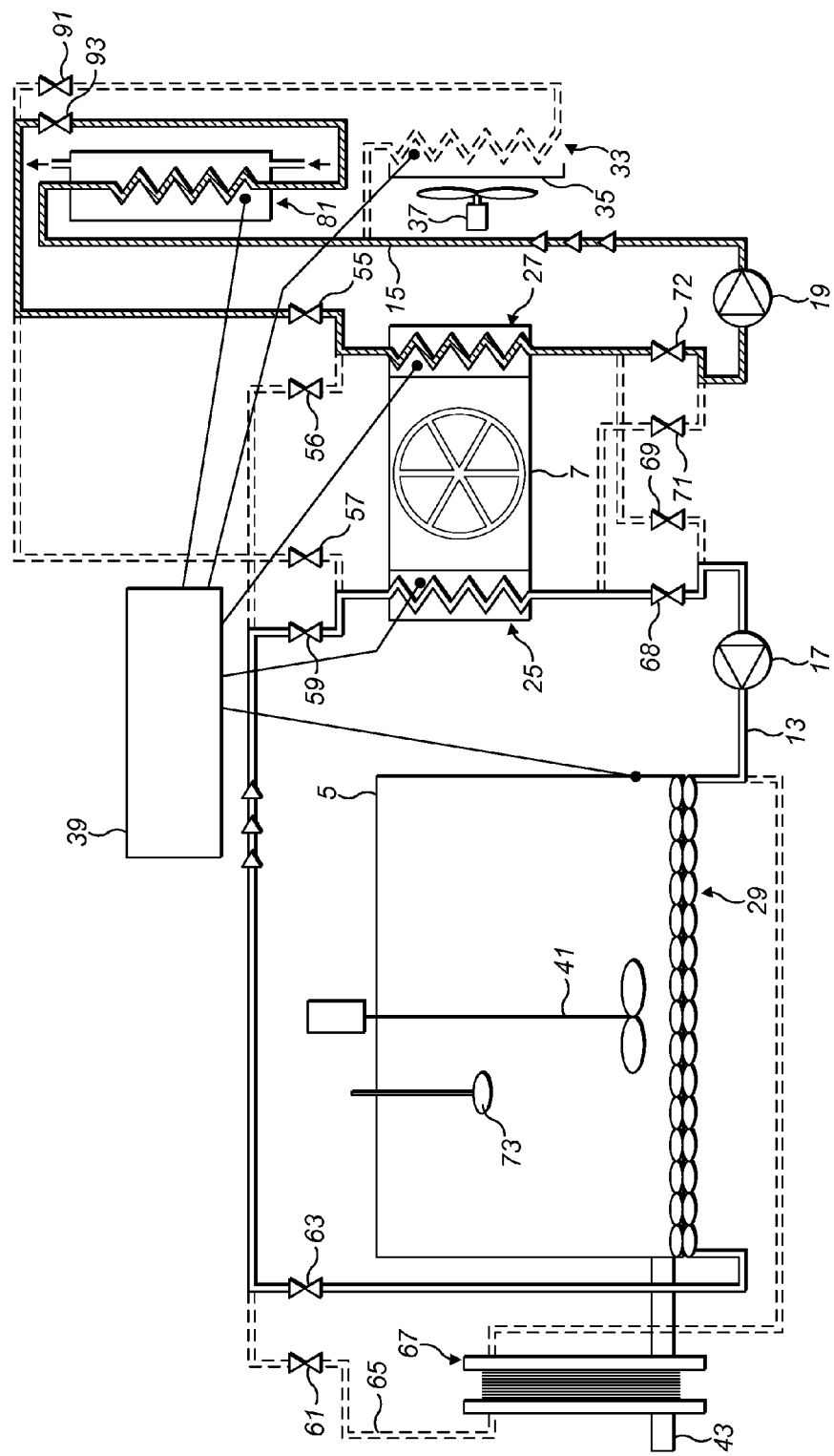
FIG. 7 is a schematic hydraulic diagram of the embodiment shown in FIG. 4 modified so as to include circuits and valves for achieving all the functions described in relation to FIGS. 1, 2b, 3, 4 and 6.

A further embodiment of the present invention is shown in FIG. 7 of the accompanying drawings. The embodiment of FIG. 7 is a particularly preferred system, which includes circuits and valves for achieving all the functions described above in relation to FIGS. 1b, 2b, 3, 4 and 6. Specifically, the embodiment of FIG. 7 is a modified version of the system shown in FIG. 4, wherein the FIG. 4 system has been modified to included a further heat exchanger 81 in parallel with the ambient heat exchanger 33 as previously described in relation to FIG. 6.

It will be appreciated that the inlet pipe(s) 43 of the arrangements shown in any of FIGS. 2 to 6 may be connected to automatic/robotic milking means as has been shown in relation to the embodiment of FIGS. 1a and 1b.

It will also be understood that the magnetic heat pump 7 may provide a variable cooling/heating power by varying the speed of the magnetic rotor. The speed of the pumps 17,19 may also be varied. This allows an adaptation of the system to the cooling needs of the milk. For example, in the system described in relation to FIG. 3, the cooling power provided by the magnetic heat pump 7 can be conveniently modulated according to incoming flow rate and/or temperature of the milk within the tank inlet pipe 43. Variable speed motors, or motors with different speed steps, may be used for driving the heat pump rotor and/or pumps 17,19.

Conventional systems for modulating the cooling power on a refrigerant compression cycle have disadvantages not associated with the system described herein. Conventional systems are costly, unreliable, and/or inefficient:

Costly: Conventional systems tend to use scroll compressors, or specially developed digital scroll compressors, requiring special devices for modifying the compliance of the scrolls, and/or the rotation speed. This is expensive.

Unreliable: In a conventional system, if the rotating speed of the compressor, or the flow of refrigerant, is reduced too much, then the lubricator circulating with the refrigerant will also have a reduced speed in the system, and will have difficulties flowing back to the compressor. This risks the compressors running with too little oil, which can lead to mechanical failures in the compressor.

Inefficient: Some conventional systems for reducing power use reducing valves. The compressor continues to run at full speed, resulting in the electricity consumption staying high when the power is reduced. Then the COP is reduced. In contrast, in the system described herein, the electricity consumption is directly related to the speed of the motor(s).

The present invention is not limited to the specific embodiments described above alternative arrangements and suitable materials will be apparent to a reader skilled in the art. For example, the heat pump 7 and associated two heat exchangers 25,27 of each of the embodiments described above can be modified so the fluid circulating in the fluid circuits 13,15 directly contacts the magnetocaloric members and cold/warm chambers of the heat pump 7. This can assist in reducing costs by avoiding the cost of the two heat exchangers 25,27 and can also assist in improving efficiency by avoiding losses in heat exchange between fluid internal to the heat pump and fluid in the fluid circuits 13,15.

The invention claimed is:

1. A system for refrigerating milk freshly obtained from a dairy animal, comprising:
   a refrigerated bulk milk tank (5) with connections to receive and hold milk freshly obtained from a dairy animal; and
   a magnetic refrigeration unit connecting to the milk tank (5), the magnetic refrigeration unit operative to maintain the milk in the milk tank at least at a coldest temperature,
   wherein the magnetic refrigeration unit comprises i) a magnetic heat pump (7) comprising plural magnetocaloric members of different Curie points and overlapping temperature ranges operating in a magnetocalo effect to provide refrigeration over a continuous temperature range from the coldest temperature to warmest temperature, ii) a first thermal communication loop (9) thermally connecting the milk tank (5) to the heat pump (7) to transport heat from the milk stored in the tank (5) to the heat pump (7), and iii) a second thermal communication loop (11) thermally connecting the heat pump (7) to transport heat away from the heat pump (7),
   wherein each of the first and second thermal communication loops comprises a closed loop fluid circuit (13, 15) with first and second heat transporting fluids respectively therein, the first thermal communication loop being fluid-isolated from the second thermal communication loop during operation of the heat pump (7).

2. The system of claim 1, further comprising:
   an animal milking stall (102) provided with an automatic milking robot (104) for attaching teat cups (106) to animal teats during milking of the animal,
   wherein the teat cups are fluidly connected to the milk tank (5) so that milk is obtained automatically from the animal and so automatically directly from the animal into the milk tank (5).

3. The system of claim 1, wherein,
   the first thermal communication loop (9) comprises a first heat exchanger (25) proximate the magnetocaloric members of the heat pump (7) to thermally transfer heat from the milk stored in the tank (5) to the magnetocaloric members of the heat pump (7), and
   the second thermal communication loop (11) comprises a second heat exchanger (27) proximate the magnetocaloric members of the heat pump (7) to thermally transfer heat thermally away from the heat pump (7).

4. The system of claim 3, wherein,
   the plural magnetocaloric members comprise eight alloys of different Curie points and overlapping temperature ranges in which each alloy exhibits the magnetocaloric effect, including
   a first alloy having a Curie point at −4° C., and exhibiting the magnetocaloric effect between −12° C. and +5° C.,
   a second alloy having a Curie point at +4° C., and exhibiting the magnetocaloric effect between −5° C. and +15° C.,
   a third alloy having a Curie point at +10° C., and exhibiting the magnetocaloric effect between −2° C. and +23° C.,
   a fourth alloy having a Curie point at +17° C., and exhibiting the magnetocaloric effect between +5° C. and +28° C.,
   a fifth alloy having a Curie point at +24° C., and exhibiting the magnetocaloric effect between +12° C. and +35° C.,
   a sixth alloy having a Curie point at +34° C., and exhibiting the magnetocaloric effect between +23° C. and +46° C.,
   a seventh alloy having a Curie point at +42° C., and exhibiting the magnetocaloric effect between +32° C. and +52° C., and
   a eighth alloy having a Curie point at +57° C., and exhibiting the magnetocaloric effect between +45° C. and +67° C.

5. The system of claim 3, wherein,
   the heat pump (7) comprises
   i) a first stage defining a cold side of the heat pump in contact with first heat exchanger (25), the first stage comprised of a first sub-set of the plural magnetocaloric members of different Curie points and overlapping temperature ranges over a cooler portion of the continuous temperature range extended from the coldest temperature, and
   ii) a second stage defining a hot side of the heat pump in contact with the second heat exchange (27), the second stage comprised of a second sub-set of plural magnetocaloric members of different Curie points and overlapping temperature ranges in a hotter portion of the continuous temperature range extended to the warmest temperature.

6. The system of claim 5, wherein,
   each of the first and second stages comprise four magnetocaloric members, each of the magnetocaloric members being of a different magnetocaloric material, the plural magnetocaloric members of each stage being arranged side-by-side in a stacked configuration.

7. The system of claim 6, wherein,
   the magnetocaloric member of the first stage having the coldest Curie point has a Curie point at −4° C., and exhibits the magnetocaloric effect between −12° C. and +5° C.

8. The system of claim 3, further comprising:
   an electronic control system (39);
   a valve arrangement (55, 56, 57, 59); and
   an additional cooling system connecting and disconnecting, via the valve arrangement (55, 56, 57, 59), to and from each of the first and second thermal communication loops,
   wherein, in cold ambient conditions below the continuous temperature range of the refrigeration unit (7), the electronic control system (39) operates the valve arrangement (55, 56, 57, 59) to connect the additional cooling system to each of the first and second thermal communication loops for cooling the milk in the milk tank (5) with the additional cooling system.

9. The system of claim 8, wherein, the electronic control system (39) further operates the valve arrangement (55, 56, 57, 59) to disconnect the refrigeration unit (7) from each of the first and second thermal communication loops, and connecting the additional cooling system to each of the first and second thermal communication loops for cooling the milk in the milk tank (5) with the additional cooling system arranges the first and second thermal communication loops as a single closed loop circuit bypassing the heat pump (7).

10. The system of claim 8, wherein, connecting the additional cooling system to each of the first and second thermal communication loops for cooling the milk in the milk tank (5) with the additional cooling system arranges the first and second thermal communication loops as a single closed loop circuit that includes the first and second heat exchangers (25, 27).

11. The system of claim 8, wherein, in a first mode, the electronic control system (39) further operates the valve arrangement (55, 56, 57, 59) to disconnect the refrigeration unit (7) from each of the first and second thermal communication loops, and connecting the additional cooling system to each of the first and second thermal communication loops for cooling the milk in the milk tank (5) with the additional cooling system arranges the first and second thermal communication loops as a single closed loop circuit bypassing the heat pump (7), and in a second mode, connecting the additional cooling system to each of the first and second thermal communication loops for cooling the milk in the milk tank (5) with the additional cooling system arranges the first and second thermal communication loops as a single closed loop circuit that includes the first and second heat exchangers (25, 27).

12. The system of claim 1, wherein, the continuous temperature range is at least minus 12 degrees Celsius to plus 70 degrees Celsius.

13. The system of claim 1, wherein, the continuous temperature range is minus 12 degrees Celsius to plus 57 degrees Celsius.

14. The system of claim 1, wherein, the continuous temperature range is minus 10 degrees Celsius to plus 70 degrees Celsius.

15. The system of claim 1, wherein, the continuous temperature range is minus 4 degrees Celsius to plus 57 degrees Celsius.

16. The system of claim 1, wherein, the magnetocaloric members have different Curie points of:

minus 4 degrees Celsius, plus 4 degrees Celsius, plus 10 degrees Celsius, plus 17 degrees Celsius, plus 24 degrees Celsius, plus 34 degrees Celsius, plus 42 degrees Celsius, and plus 57 degrees Celsius.

17. The system of claim 16, wherein, wherein the magnetocaloric members comprise one of the group consisting of (i) Gadolinium alloys; (ii) La Fe Co Si alloys; and (iii) Mn Fe P As alloys.

18. The system of claim 1, wherein, the magnetocaloric members have a change in entropy produced by a change in a magnetic field of 1.6 tesla that is greater than substantially 2.0 J/kg.K across the continuous temperature range, the continuous temperature range being −12° C. to +67° C.

19. The system of claim 1, wherein, the plural magnetocaloric members comprise plural of $La(Fe,Co,Si)_{13}$ alloys of different Curie points and overlapping temperature ranges.

* * * * *